SERVO SYSTEM USING A MAGNETIC AMPLIFIER MIXER

Filed Nov. 14, 1952 3 Sheets-Sheet 1

INVENTOR
SIDNEY B. COHEN
BY James P. Malone
ATTORNEY

SERVO SYSTEM USING A MAGNETIC AMPLIFIER MIXER

Filed Nov. 14, 1952 3 Sheets-Sheet 2

INVENTOR
SIDNEY B. COHEN
BY
James P. Malone
ATTORNEY

SERVO SYSTEM USING A MAGNETIC AMPLIFIER MIXER

Filed Nov. 14, 1952

INVENTOR
SIDNEY B. COHEN
BY
James P. Malone
ATTORNEY

United States Patent Office 2,832,019

Patented Apr. 22, 1958

2,832,019

SERVO SYSTEM USING A MAGNETIC AMPLIFIER MIXER

Sidney B. Cohen, Bayside, N. Y., assignor to Sperry Rand Corporation, a corporation of Delaware Application November 14, 1952, Serial No. 320,558

8 Claims. (Cl. 318—30)

This invention relates to magnetic amplifier systems, and more particularly to such systems utilizing magnetic amplifiers which are adapted to be controlled by separate alternating and direct current signals.

It is frequently desirable to mix or combine alternating and direct current control signals in an amplifier. For instance, in a servo system, it may be advantageous to add a direct current rate or a feedback signal to an alternating control signal to give the system better performance or greater stability. Heretofore, it has not been practical to do this with magnetic amplifiers, since they are not provided with means for combining or mixing the different control signals.

Heretofore, when it has been desired to use separate alternating (A. C.) and direct (D. C.) control signals, it has been necessary to change all the signals to either alternating or direct. This involves the use of phase sensitive demodulators or other equivalent devices and increases the complexity of the circuits considerably. The present invention provides means for mixing alternating (A. C.) and direct (D. C.) signals directly in the magnetic cores of the magnetic amplifiers, thus eliminating all phase sensitive demodulators or other phase sensitive devices.

The present invention comprises a magnetic amplifier having separate alternating current (A. C.) and direct current (D. C.) control windings. One of the control signals, for instance, the alternating signal, may be an error signal and the other signal may be a rate of error or a feedback signal. The two signals are combined in the magnetic core of the amplifier so that the amplifier output is a function of both signals.

Accordingly, a principal object of the present invention is to provide a magnetic amplifier having means to mix alternating and direct current control signals.

Another object of the present invention is to provide magnetic amplifier means to mix or combine at least two control signals.

Another object of the present invention is to provide a magnetic amplifier mixer.

Another object of the present invention is to provide a servo system utilizing magnetic amplifiers with feedback control means.

Another object of the present invention is to provide a magnetic amplifier servo system incorporating means to apply a rate control signal.

These and other objects of the invention will be apparent in the following specification and drawings, of which:

The action of a magnetic amplifier is somewhat analogous to that of a thyratron. Assume that the plate of the thyratron is energized from an A. C. source. If the grid is held at a low negative value while the plate potential goes through the positive half-cycle, the tube will not conduct. Conversely, if the grid is held positive (or less negative), the tube will "fire" or become conductive early in the positive half-cycle of the plate potential and will conduct until the plate voltage falls to the extinction value. When the grid and plate potentials are in phase and of sufficient magnitude, the tube conducts during the entire positive half-cycle.

The firing point can be shifted to any position by varying the grid potential or phase relationship between grid and plate potential. As the firing point is shifted to the left or right, the average current through the thyratron, and therefore through any load in series with it, can be decreased or increased. The phase position of the firing point relative to the plate voltage is known as the firing angle.

Figure 1:
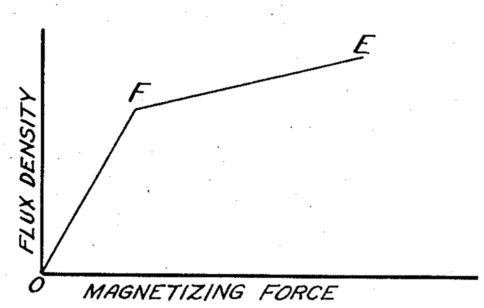
Fig. 1 is a diagram illustrative of the theory of magnetic amplifiers.

The operation of a magnetic amplifier depends on the principle of magnetic saturation. First consider the action of a simple type of saturable-core reactor. Assume the line OF of Fig. 1 represents the magnetization curve of the core material for flux densities below saturation. Since saturation is reached at F, additional magnetizing force causes the flux to increase at a much slower rate, as indicated by FE. In actual practice F is never a sharp bend but is so drawn in the diagram for simplicity.

As long as the flux density in a saturable reactor remains within the region OF, the reactor has high inductance and any load in series with it across an A. C. line will receive little current. However, if the flux density increases into the region FE, the reactor will have low inductance and a load in series with it will be placed effectively across the line.

It is possible to design a reactor so that a weak current flowing in the control winding can control the saturation of the core, permitting large variations in the power current. It is this characteristic that enables such a reactor to function as an amplifier. The point of saturation F in Fig. 1 will be referred to as the firing point.

Figure 2:
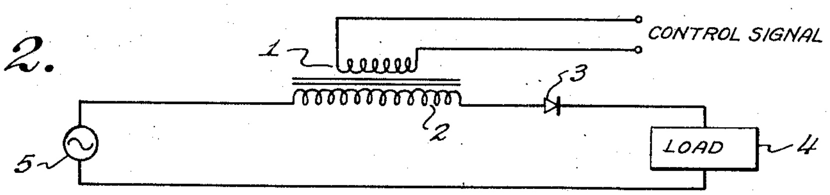
Fig. 2 is an illustrative diagram of a self-saturable reactor system.

The self-saturable type of magnetic amplifier is shown in elementary form in Fig. 2. It consists of a reactor having a magnetic core with a control winding 1 and a power winding 2, and a rectifier element 3. The power winding and rectifier are connected in series with a load 4 to an A. C. source 5.

Figure 3A:
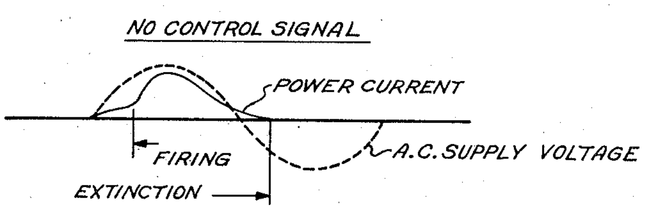
Figs. 3A, 3B and 3C are waveforms illustrative of the operation of the system of Fig. 2.
Figure 3B:
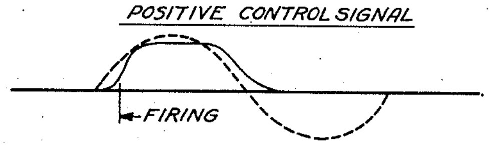
Figure 3C:
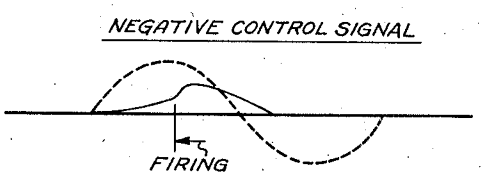

The action of this type of amplifier circuit is illustrated in Figs. 3A, 3B and 3C. With no control current, the power current increases slowly at first as indicated in Fig. 3A. When the firing point is reached, the current increases rapidly due to the greatly reduced inductance, then decays to the extinction point which, due to the inductive nature of the circuit, is some distance beyond the end of the positive half-cycle of the supply voltage.

When a positive control signal is applied, the magnetic flux due to the current through the control winding aids the flux generated by the power winding and firing occurs earlier as shown in Fig. 3B. The average value of the power current is increased considerably.

When a negative control signal is applied, the magnetic flux generated by the control winding opposes that generated by the power winding and firing occurs later as shown in Fig. 3C. The average value of current, therefore, is less than in the two previous cases.

The rectifier in the power winding circuit, Fig. 2, causes the power current to be pulsating D. C. which has an average value dependent upon the amplitude and polarity of the signal current. Since the average power current varies with the signal, and since power current and signal current both develop flux in the core, the increase of flux is much greater than would be the case if the control current alone were causing it. This increased flux, in turn, lowers the inductance of the reactor, leading to an even greater average power current. Consequently, a greater current change is obtained, for a given control signal, by the use of the rectifier than is obtained in the circuit without self-saturation.

The rectifying amplifier is termed self-saturable since the power current flux, increased as a result of the control current flux, facilitates saturation. It is, in effect, a type of positive feedback device. This principle of self-saturation is used in the magnetic amplifier illustrating the present invention. However, the invention is not limited to the self-saturable type amplifier.

It follows from the foregoing discussion that if the control current is varied from maximum positive through zero to maximum negative, the average power current (D. C.) falls from maximum to minimum. The average power current, however, cannot be brought to zero nor cani t be reversed. In addition, the simple amplifier of Fig. 2 can deliver only pulsating D. C. For these reasons a more elaborate amplifier circuit than that shown in Fig. 2 is desirable.

Figure 4:
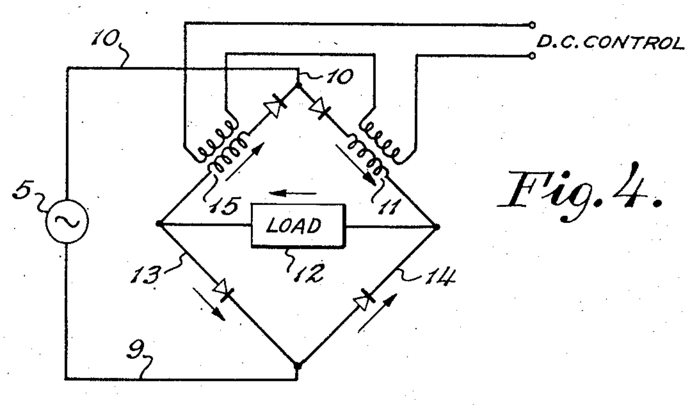
Fig. 4 is a diagram of the full wave magnetic amplifier.

An amplifier utilizing a full-wave A. C. supply is shown in Fig. 4. The advantage of this unit is that the pulsating D. C. output (full-wave rectified A. C.) is smoother, since the ripple frequency is twice the supply frequency.

Referring to Fig. 4, when the upper lead 10 is positive, current flows as shown by the arrow through the upper right arm 11 of the circuit, to the left through the load 12, and then through the lower left arm 13. When the lower lead 9 is positive, the path can be traced similarly, through arm 14, load 12 and arm 15. Because of the rectifier action, the current through the load and also through each reactor is unidirectional.

Two disadvantages of this simple full-wave amplifier are: (1) the load current cannot be brought to zero, since while the reactor impedance can be raised, it never becomes infinite; and (2) the load current cannot be reversed. These difficulties are overcome in balanced amplifiers.

Figure 5:
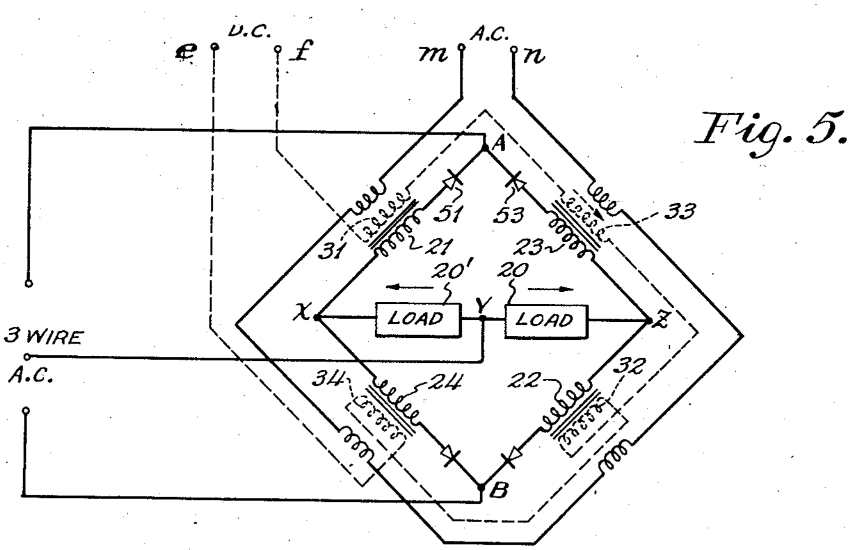
Fig. 5 is a schematic diagram of an embodiment of the magnetic mixer amplifier of the present invention.

A balanced or double-ended magnetic amplifier, as shown in Fig. 5, is an amplifier which has: (1) zero resultant load current with zero control signal; (2) a load current (when a signal is applied) with a direction sense corresponding to that of the signal, and (3) a load current which varies in direct proportion to the strength of the control signal.

Figure 5A:
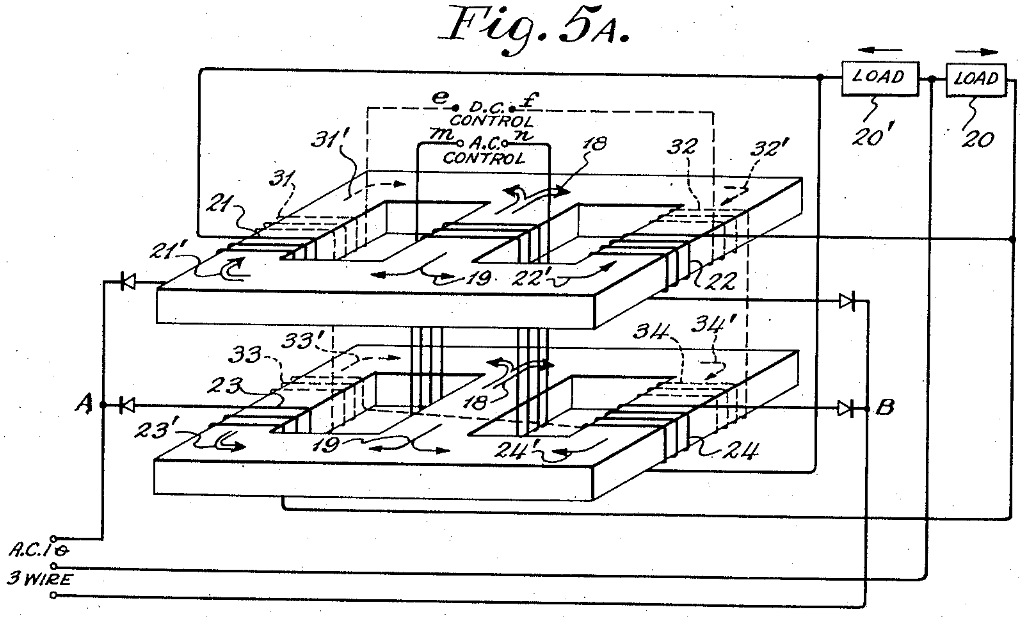
Fig. 5A is a showing of an embodiment of the magnetic mixer amplifier of the invention.

Figs. 5 and 5A show a balanced amplifier embodiment of the present invention having both alternating and direct current (A. C. and D. C.) inputs. The alternating control winding may be energized, for instance, by the output of a synchro control transformer and the control current is either in phase or 180 degrees out of phase with the alternating current (A. C.) supply. The direct current (D. C.) input may be a rate signal but it is not so limited.

The amplifier of Fig. 5, considered generally, comprises the power windings 21, 22, 23 and 24, an alternating current control winding connected to terminals *m* and *n*, and a direct current control winding connected to terminals *e* and *f*.

Fig. 5A shows an embodiment of the invention utilizing a pair of three-legged magnetic cores, the power windings being connected in series and wound about the outside legs as are the direct current control windings *e*—*f*. The alternating control coil *m*—*n* is wound about the center legs, as shown. In Fig. 5A:

Arrows in outside legs indicate direction of flux due to power windings
Arrows in center legs indicate direction of control flux
Double arrows indicate reversed flux occurring on reverse half of cycle Referring now to Fig. 5 and considering only the power windings 21, 22, 23 and 24, it may be seen that when the top supply lead, point A, is positive, no current flows through it because of the blocking action of the rectifiers 51 and 53. The arrow portion of the rectifiers show the direction of current flow. The center tap Y, however, is positive with respect to the bottom, point B, and current flows in both directions through the load 20, 20′ and through windings 22 and 24. On the next half cycle current flows through the load 20, 20′ in the same direction as before but through windings 21 and 23.

The function of the reactors and control current can be more readily followed from Fig. 5A which indicates an actual arrangement of cores and windings. The alternating current (A. C.) control winding *m*—*n* passes around the center legs of the two three-legged cores, and the four power windings are wound separately around the outside legs. First, assume that no current flows in the control winding *m*—*n*, so that the firing angles are equal in the four outside legs. When the bottom alternating current (A. C.) lead, point B, Figs. 5 and 5A, is negative, equalized currents flow from the center tap Y through the load and windings 22 and 24. The corresponding fluxes generated in the core are indicated by the single arrows 22′ and 24′ near these windings, Fig. 5A.

When the top alternating current (A. C.) lead, point A, is negative, the fluxes generated by windings 21 and 23 are as indicated by the double arrows 21′ and 23′. All the end-leg fluxes, of course, flow through the center legs as well. With no signal current the four reactors have equal firing angles and therefore equal impedance. The load currents are equal and opposite and the effective output to the load output winding, therefore, is zero.

To understand the alternating current (A. C.) control of the amplifier, disregard for the moment the direct current (D. C.) control windings shown by dotted lines, and assume the direction sense of phasing of the control signal is such as to require a net load current through the right-hand portion 20 of the load. Therefore, when the bottom alternating current (A. C.) lead, point B, is negative, the left-hand control lead *m* would be positive. The control winding flux is then indicated by the arrows 19 on the middle legs and the flux generated by reactors 22 and 24 is indicated by the single arrows 22′ and 24′ and near the reactors. The alternating control current flux 19 aids the flux 22′ generated by reactor 22 and opposes that generated by reactor 24. Therefore, current through load 20 is greater than through 20′.

On the next half cycle, when point A is negative and the right-hand control lead *m* is positive, the control current flux double arrows 18 aids the flux 23′ generated by reactor 23 and opposes flux 21′ generated by reactor 21. The net load current, therefore, is in the direction indicated by the arrow over the right-hand portion 20 of the load. For the opposite phase of control current the reverse control fluxes will apply and the net load current will be through the left-hand portion 20′ of the load. Only two of the power windings operate on each half cycle due to the rectifier arrangement.

If a direct current (D. C.) control signal is applied to the direct current (D. C.) windings 31, 32, 33 and 34, with a polarity causing the fluxes shown in Fig. 5A, the resultant fluxes 31′, 32′, 33′ and 34′ aid reactors 21 and 24, and oppose reactors 22 and 23. The load current through the left-hand portion 20′ of the load is thereby increased and the current through the right-hand portion decreased. By this means alternating current (A. C.) and direct current (D. C.) control signals are mixed within the amplifier. One of the control signals may be a rate or a feedback signal.

Figure 6:
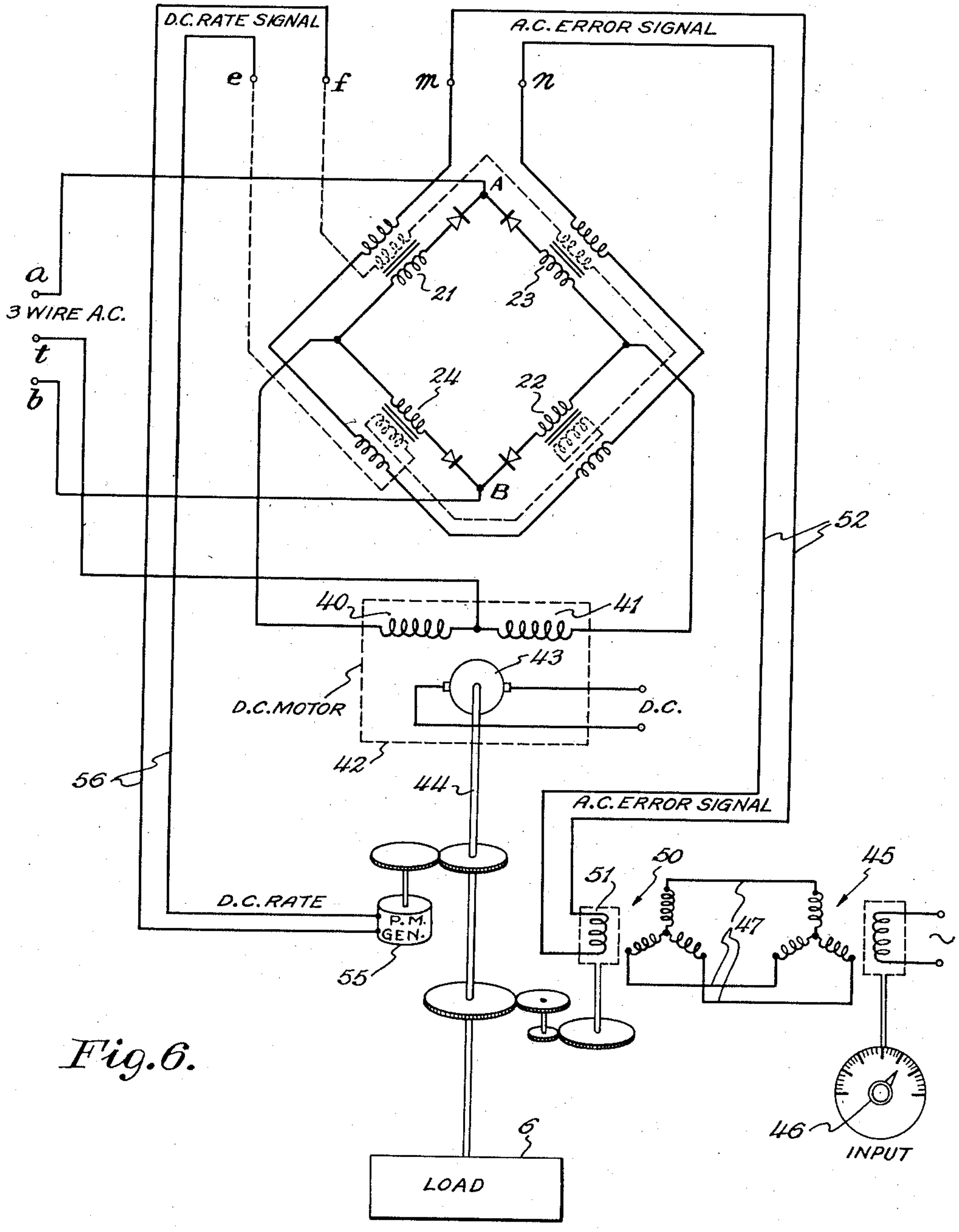
Fig. 6 is a schematic diagram of a servo system utilizing the magnetic mixer amplifier.

Fig. 6 illustrates the use of the mixer amplifier of Fig.

5 in a servo system. The mixer amplifier is the same as shown in Fig. 5 and comprises the power windings 21, 22, 23 and 24, each with their associated rectifiers. The power input is three-wire alternating current on the leads *a*, *b* and *t*. The alternating current error signal is applied to the terminals *m*—*n*, and an additional direct current control signal is applied to the terminals *e* and *f*. The direct current signal is shown as a rate signal but is not so limited. For instance, it may be a portion of the output signal fed back for stabilization of the amplifier or a separate control signal. The outputs of the amplifier are the differential field windings 40, 41 of reversible direct current motor 42. The direction of the motor depends on which winding is energized. The armature 43 of the motor is energized with commutated direct current power in conventional manner. The shaft 44 of the motor is connected to the useful load 60 which may be anything which is adaptable to be driven by a servo system, for instance, steering or any other control apparatus.

The error signal is derived as follows. A desired control input is put into the system by means of input knob 46 of the synchro transmitter 45. The signal developed by synchro transmitter 45 is transmitted over the leads 47 to a synchro control transformer 50. The rotor 51 of the control transformer is directly geared to the output shaft 44 so that if there is a lack of correspondence between the input of knob 46 and the position of the shaft 44, there will be an error signal generated in the rotor 51. This error signal is connected to the alternating current (A. C.) winding of the mixer amplifier by means of the leads 52, and energizes the amplifier in such a manner as to correct the error.

The direct current (D. C.) input to the mixer amplifier is a rate signal which is generated by a permanent-magnet generator 55 which is directly geared to the output shaft 44. The rate generator 55 will, therefore, provide a direct current signal proportional to the rate of rotation of the shaft 44 and this signal is connected by means of the leads 56 to the terminals *e* and *f* of the direct current (D. C.) control windings of the mixer amplifier. Alternatively the feedback signal might be taken directly from the output of the amplifier.

The present invention provides means combining a direct current signal such as a rate signal, and an alternating current error signal directly in a magnetic amplifier without the necessity of changing separate alternating and direct current signals into one or the other, by means of phase sensitive demodulators or other complicated circuitry.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A magnetic amplifier mixer including a pair of saturable reactors each having a core comprised of a central leg and two outer legs forming closed magnetic paths, a common signal winding on the central legs of said cores for connection with an alternating current control signal source, a common signal winding on the outer legs of said cores for connection with a direct current control signal source, an alternating current power source, and a load winding on each outer leg of said cores connected to said power source, said winding being so connected and arranged on said cores as to pass load current in response to both input signals to said control windings.

2. A servo system including a magnetic amplifier mixer having closed magnetic paths, an alternating current control winding wound about said magnetic paths, a direct current control winding wound about said magnetic paths, a plurality of power windings wound about said magnetic paths and connected in a bridge, a power source connected across two opposing junctions of said bridge, a reversible motor having its field windings connected across the other two junctions of said bridge, a direct current generator driven by said motor and connected to supply its output to said direct current control windings as a direct current feed back control signal, whereby an alternating current control signal applied to said alternating current control winding controls said motor in combination with said direct current feed back control signal.

3. A servo system including a magnetic amplifier mixer having a plurality of closed magnetic paths, direct current control windings wound about said magnetic paths, alternating current control winding means about said magnetic paths, a plurality of power windings wound about said magnetic paths and connected in a bridge, a power source connected across two opposing junctions of said bridge, a reversible motor having its field windings connected across the other two junctions of said bridge, a direct current generator driven by the output shaft of said motor, means to generate an alternating current error signal including a synchro transmitter adapted to receive an input control signal, a synchro transformer connected to said synchro generator and having its rotor geared to said output shaft, and means for impressing the signal realized across said rotor upon said alternating current control winding means.

4. A magnetic amplifier mixer including four power windings each connected in series with a rectifying device to form four winding-rectifier combinations, said four winding-rectifier combinations being connected in a bridge circuit having two pairs of opposite junctions, two load impedances connected in series and across one of said pairs of opposite junctions, the junction between said load impedances and the other pair of said pairs of opposite junctions being respectively adapted for connection to the center and two outside wires of a three wire alternating voltage source, each of said four power windings being associated with a saturable magnetic flux path, each power winding providing magnetic flux in a predetermined direction in the magnetic path associated therewith whenever an alternating voltage applied to a winding-rectifier combination in which said last-named winding is a part is proper for conduction of current through the rectifier of said last-named combination, alternating current control winding means adapted for connection to an alternating control voltage and associated with each of said magnetic paths, said alternating current winding means being wound for producing magnetic flux in response to an alternating control voltage which aids the flux produced in a first pair of said magnetic paths by one pair of said power windings and opposes the flux produced in a second pair of said magnetic paths by the other pair of said power windings, a direct current control winding means adapted for connection to a source of unidirectional control voltage and associated with each of said magnetic paths, said direct current control winding means being wound so that they produce magnetic flux in response to a direct current control voltage which aids the flux produced in one of said pairs of said magnetic paths by said power windings and opposes the flux produced in the other of said pairs of magnetic paths by said power windings, whereby the current through said load impedances is controlled by the current in both of said alternating and direct control windings.

5. A magnetic amplifier mixer having first, second, third and fourth windings, each connected in series with a rectifying device to form respective first, second, third and fourth winding-rectifier combinations, said first, second, third and fourth winding-rectifier combinations being connected in a bridge circuit consecutively in the order named, windings one and two and windings three and four, respectively, forming two pairs of windings, two load impedances connected in series and between the junction of the first and fourth combination and the junction of the second and third combination, the junction of said first and second winding-rectifier combination and the junction of said third and fourth winding-rectifier combination being adapted for connection, respectively, to the first and second terminals of a three-wire, single-phase alternating voltage source having a third center terminal, the junction of said load impedances being adapted for connection to said center terminal, said rectifiers being poled so that current can flow in only one direction through said center terminal and through the windings of only one of said pairs of windings at any one instant, a saturable magnetic flux path associated with each of said windings, means for producing a first magnetic flux of alternating direction in each of said paths, said windings and said flux producing means being arranged so that the relation between said first flux and the flux produced by any one of a pair of said windings is always opposite to the relation between said first flux and the flux produced by the adjacent winding of said one pair of windings in said circuit, and means for producing a unidirectional flux in each of said magnetic paths, said unidirectional flux producing means being arranged so that the relation between said unidirectional flux and the flux produced by any one of a pair of said windings is always opposite to the relation between said unidirectional flux and the flux produced by the other winding of said one pair of windings.

6. The magnetic amplifier mixer of claim 5, in combination with a servo system and arranged so that the two load impedances are, respectively, the two field windings of a reversible servomotor and in which the means for producing the first magnetic alternating flux and the means for producing the unidirectional flux are respectively controlled by operational characteristics of the servo system.

7. In combination, a servo system having a reversible servomotor including two field windings, a magnetic amplifier mixer including four power windings each connected in series with a rectifying device to form four winding-rectifier combinations, said four winding-rectifier combinations being connected in a bridge circuit having two pairs of opposite junctions, the two field windings of said servomotor comprising two load impedances connected in series and across one of said pairs of said opposite junctions, the junction between said load impedances and the other pair of said pairs of opposite junctions being respectively adapted for connection to the center and two outside wires of a three wire alternating voltage source, each of said power windings being associated with a saturable magnetic path, alternating current control winding means and direct current control winding means connected respectively to sources of alternating and direct potential, each representative of a different operational characteristic of said servo system, said alternating and direct current control winding means being associated with each of said magnetic paths so that the current through said load impedances is controlled by the current in both of said alternating and direct control windings.

8. A magnetic amplifier mixer, comprising four saturable magnetic flux paths, at least four power windings, one of said four power windings being disposed about each of said four flux paths; further means including a plurality of rectifiers, load means and A.-C. power voltage supply means connected together with said four power windings for providing a magnetic amplifier power circuit for producing a full wave voltage output across said load means, A.-C. control voltage winding means disposed about said four flux paths for producing lines of magnetic flux in each of said flux paths in response to an A.-C. control voltage, said A.-C. control voltage winding means being wound so that the magnetic flux produced thereby opposes the flux produced by said power windings in a first pair of said flux paths and aids the flux produced by said power windings in a second pair of said flux paths, and D.-C. control voltage winding means disposed about said four flux paths for producing lines of magnetic flux in each of said flux paths in response to a D.-C. control voltage, said D.-C. control voltage winding means being wound so that the magnetic flux produced thereby opposes the flux produced by said power windings in one of said pairs of flux paths and aids the flux produced by said power windings in the other of said pairs of flux paths, whereby a full wave magnetic amplifier responsive to both A.-C. and D.-C. control voltage signals is provided.

References Cited in the file of this patent

UNITED STATES PATENTS

| | | |
|---|---|---|
| 2,555,992 | Ogle | June 5, 1951 |
| 2,565,157 | Wickerham et al. | Aug. 21, 1951 |
| 2,586,397 | Tuttle | Feb. 19, 1952 |
| 2,636,150 | McKenney et al. | Apr. 21, 1953 |

FOREIGN PATENTS

| | | |
|---|---|---|
| 235,142 | Switzerland | Mar. 15, 1945 |
| 609,294 | Great Britain | Sept. 29, 1948 |

OTHER REFERENCES

Magnetic Amplifier Circuits, Geyger, W. A., McGraw-Hill, 1954, p. 203, Fig. 14.2*b*.

"Magnetic Amplifiers," Vickers Elec. Div., St. Louis, Missouri, 1949.

"Improved Magnetic Servo Amplifier," Lufcy, AIEE Transactions, vol. 71, part 1, September 1952, pp. 281–287.

"Journal of the Institution of Electrical Engineers," vol. 94, part IIA, No. 1, 1947, pp. 5–7.